United States Patent [19]

Humiston

[11] Patent Number: 4,575,200

[45] Date of Patent: Mar. 11, 1986

[54] FLEXIBLE MIRROR DEVICE

[76] Inventor: Gerald F. Humiston, c/o Beaugeste, 14525 62nd St., North, Clearwater, Fla. 33520

[21] Appl. No.: 513,334

[22] Filed: Jul. 13, 1983

[51] Int. Cl.[4] .............................................. G02B 7/18

[52] U.S. Cl. .................................. 350/611; 350/607; 272/8 M

[58] Field of Search ............... 350/295, 611, 608, 607; 272/8 M, 13; 434/371

[56] References Cited

U.S. PATENT DOCUMENTS

| | | | |
|---|---|---|---|
| 1,129,452 | 10/1948 | Key | 350/611 |
| 3,004,472 | 10/1961 | Buxton | 350/295 |
| 3,140,347 | 7/1964 | Cohen | 350/295 |
| 3,445,157 | 5/1969 | Zitter | 350/295 |
| 3,832,039 | 8/1974 | Doolittle | 350/295 |
| 4,196,972 | 8/1980 | Rowlings | 350/295 |

FOREIGN PATENT DOCUMENTS

| | | | |
|---|---|---|---|
| 1060662 | 3/1967 | United Kingdom | 350/295 |

*Primary Examiner*—Jon W. Henry

*Attorney, Agent, or Firm*—Frijouf, Rust & Pyle

[57] ABSTRACT

A flexible mirror device for providing a modified reflection of the body of a person is disclosed. The mirror device includes a first frame member and a second frame member disposed parallel to the first frame member and an upper and a lower frame member spaced from each other and extending between the first and the second frame members. A transverse shaft extends between and is rotatably secured relative to the first and second frame members. A first and second cam are rigidly secured adjacent a first and second end, respectively, of the transverse shaft and cooperate respectively with a first and second mirror support. A flexible mirror extends between the mirror supports. A central frame member which extends between the lower frame member and the transverse shaft is attached to the mirror such that rotation of the transverse shaft results in a changing curvature of the mirror. The mirror is also attached to a flexible transverse frame means disposed in the vicinity of the upper frame member such that rotation of the transverse shaft results in a differential change of curvature of the mirror in the vicinity of the transverse shaft relative to the change in curvature in the vicinity of the flexible transverse frame means.

15 Claims, 6 Drawing Figures

FLEXIBLE MIRROR DEVICE

BACKGROUND OF THE INVENTION

1. Field of the Invention

This invention relates to flexible mirror devices. More specifically, this invention relates to a flexible mirror device which provides a modified reflection of the body of a person.

2. Information Disclosure Statement

One of the main difficulties experienced by a person having a weight problem is the development of a sufficient desire to lose weight. Although an overweight person may read about the health hazards associated with obesity, the mere reading about such dangers or seeing others who have well proportioned figures is oftentimes insufficient to persuade the person to undergo the rigors of a controlled diet.

However, if the same person were able to see himself as he appears to others and then within seconds see himself as he would appear after losing 15 to 20 pounds, the visual representation of himself as he would be after the weight loss would provide the required stimulus to that person to continue a determined effort to persevere with a diet plan.

The present invention seeks to provide such a stimulus by the provision of a flexible mirror, the curvature of which can be progressively changed to provide a modified reflection of the body of a person standing in front of the mirror.

Although in the prior art various proposals have been made to provide mirrors that produce distorted reflections of the body of a person standing in front of the mirror, none of the prior art devices have provided a visual representation that accurately portrays the desired proportions in a realistic manner.

U.S. Pat. No. 3,445,157 to R. Zilter discloses a hand operated distorting toy mirror. The mirror curvature is increased or decreased in order to make a person standing in front of the device appear fat or thin, tall or short.

U.S. Pat. No. 3,004,472 to D. E. Buxton teaches a flexible mirror supported at opposite edges thereof and curved outwardly by means of a roller supported by an adjustable rocker arm.

U.S. Pat. No. 3,832,039 to M. A. Doolittle describes a flexible mirror having an upper portion which remains substantially planar and a lower portion, the curvature of which is controllably varied. Unfortunately, the device of U.S. Pat. No. 3,832,039 fails to provide a realistic representation of the body of a person as it would appear after the necessary weight loss. This failure results largely from the fact that, when a person diets, weight is lost not only from the neck downwards, but also from the face. U.S. Pat. No. 3,832,039 provides an unrealistic representation because although the portion of the body from the neck downwards is made to appear thinner, the representation of the head remains substantially constant.

The present invention overcomes the aforementioned inadequacies of the prior art device by the provision of a flexible mirror device which provides a differential change in curvature of the mirror along the length thereof. Such differential change in curvature results in a representation showing weight loss from the facial region as well as the rest of the body of a person. It is the primary object of the present invention to provide a flexible mirror device that overcomes the inadequacies of the prior art devices and provides an improvement which significantly contributes to the realistic representation of the desired proportions of the body of a person standing in front of the mirror.

Another object of the present invention is the provision of a flexible mirror device having a differential change in curvature of the mirror along the length thereof.

Another object of the present invention is the provision of a flexible mirror device which provides a modified reflection of the body of a person, the portion of the mirror reflecting the head of the person having a curvature that is different from the curvature of that portion of the mirror reflecting the rest of the body of the person.

Another objective of the present invention is the provision of a transverse shaft rotatably mounted within frame members such that rotation of the transverse shaft rotates cams disposed adjacent the respective ends of the shaft to change the curvature of the mirror.

Another object of the present invention is the provision of a first electric motor drivingly connected to the transverse shaft, the motor being controlled remotely from a control box electrically connected to the motor.

Another object of the present invention is the provision of a radio control means for controlling the electric motor and the curvature of the mirror.

Another object of the present invention is the provision of a micro switch means which cooperates with a transverse shaft collar, the switch being electrically connected to a display device disposed on the mirror, the display device displaying the amount of curvature of the mirror.

Another objective of the present invention is the provision of a longitudinal shaft and a hook carriage threadably engaging the longitudinal shaft such that rotation of the longitudinal shaft results in relative movement between the hook carriage and the longitudinal shaft for elevating or lowering the flexible mirror device.

Another object of the present invention is the provision of a second electric motor drivingly connected to the longitudinal shaft.

Another object of the invention is the provision of a control box disposed remote from the mirror device, the control box functioning to remotely control the elevating or lowering of the mirror device.

Another object of the present invention is the provision of a flexible transverse frame means extending between the first and the second frame members for flexibly supporting the mirror in the vicinity of the upper frame member.

A further object of the present invention is the provision of a flexible mirror which includes an upper, a lower and an intermediate mirror portion and a supporting frame disposed around and adjacent to the flexible mirror. The mirror is supported relative the frame adjacent each corner of the mirror and the variation in curvature of the mirror about the longitudinal axis thereof is greater in the vicinity of the intermediate mirror portion than in the vicinity of the upper or lower mirror portions, respectively.

The foregoing has outlined some of the more pertinent objects of the present invention. These objects should be construed as being merely illustrative of some of the more prominent features and applications of the invention. Many other beneficial results can be attained by applying the disclosed invention in a different manner or modifying the invention within the scope of the disclosure. Particularly with regard to the use of the invention disclosed herein, this should not be construed as being limited to flexible mirror devices for use in health spas and weight loss clinics, but should include flexible mirror devices for modifying the reflection of the body of any person standing in front of the mirror.

SUMMARY OF THE INVENTION

The flexible mirror device of the present invention is defined by the appended claims with a specific embodiment shown in the attached drawings. For the purpose of summarizing the invention, the invention relates to a flexible mirror device for modifying the reflection of the body of a person standing in front of the mirror. The flexible mirror device includes a first frame member and a second frame member disposed parallel to the first frame member. An upper and a lower frame member are spaced relative each other and extend between the first and the second frame members. A transverse shaft is rotatably secured relative to and extends between the first and second frame members. A first and a second cam are rigidly secured adjacent a first and a second end, respectively, of the transverse shaft. The first and the second cams cooperate respectively with a first and a second mirror support such that rotation of the transverse shaft results in a change in curvature of a flexible mirror extending between the mirror supports. A central frame member extends between the lower frame member and the transverse shaft and the mirror is attached to the central frame member. A flexible transverse frame disposed in the vicinity of the upper frame member extends between the first and the second frame members. The mirror is also attached to the flexible transverse frame such that rotation of the transverse shaft results in a differential change in curvature of the mirror in the vicinity of the transverse shaft relative the change in curvature of the mirror in the vicinity of the flexible transverse frame.

In a more specific embodiment of the present invention, the longitudinal shaft is rotatably secured and extends between the central and upper frame members. A hook carriage is threadably engaged by the longitudinal shaft such that rotation of the longitudinal shaft results in relative movement between the hook carriage and the rest of the flexible mirror device. A hook is rigidly secured to the hook carriage so that when the hook is used to suspend the flexible mirror device, rotation of the longitudinal shaft causes the elevation or lowering of the flexible mirror device relative the hook.

The present invention also includes a radio control or alternatively, an electrically connected control box located remote from the flexible mirror device for controlling the change in curvature of the flexible mirror and the relative elevation of the flexible mirror device. The change in curvature and relative elevation are indicated by a display device disposed on the mirror. The display device is electrically connected to micro switches and cooperating collars disposed respectively on the transverse and longitudinal shafts.

In a further embodiment of the present invention, the flexible mirror includes an upper, a lower and an intermediate mirror portion. A supporting frame is disposed around and adjacent to the flexible mirror. The mirror is supported relative the frame adjacent each corner of the mirror. The mirror is curved about a longitudinal axis thereof such that the variation in curvature of the mirror about the longitudinal axis is greater in the vicinity of the intermediate mirror portion than in the vicinity of the upper and lower mirror portions, respectively.

The foregoing has outlined rather broadly the more pertinent and important features of the present invention in order that the detailed description of the invention that follows may be better understood so that the present contribution to the art can be more fully appreciated. Additionally, features of the invention will be described hereinafter which form the subject of the claims of the invention. It should be appreciated by those skilled in the art that the conception of the specific embodiment disclosed may be readily utilized as a basis for modifying or designing other devices for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the accompanying drawings in which.

Similar reference characters refer to similar parts throughout the several views of the drawings.

DETAILED DESCRIPTION

Figure 1:
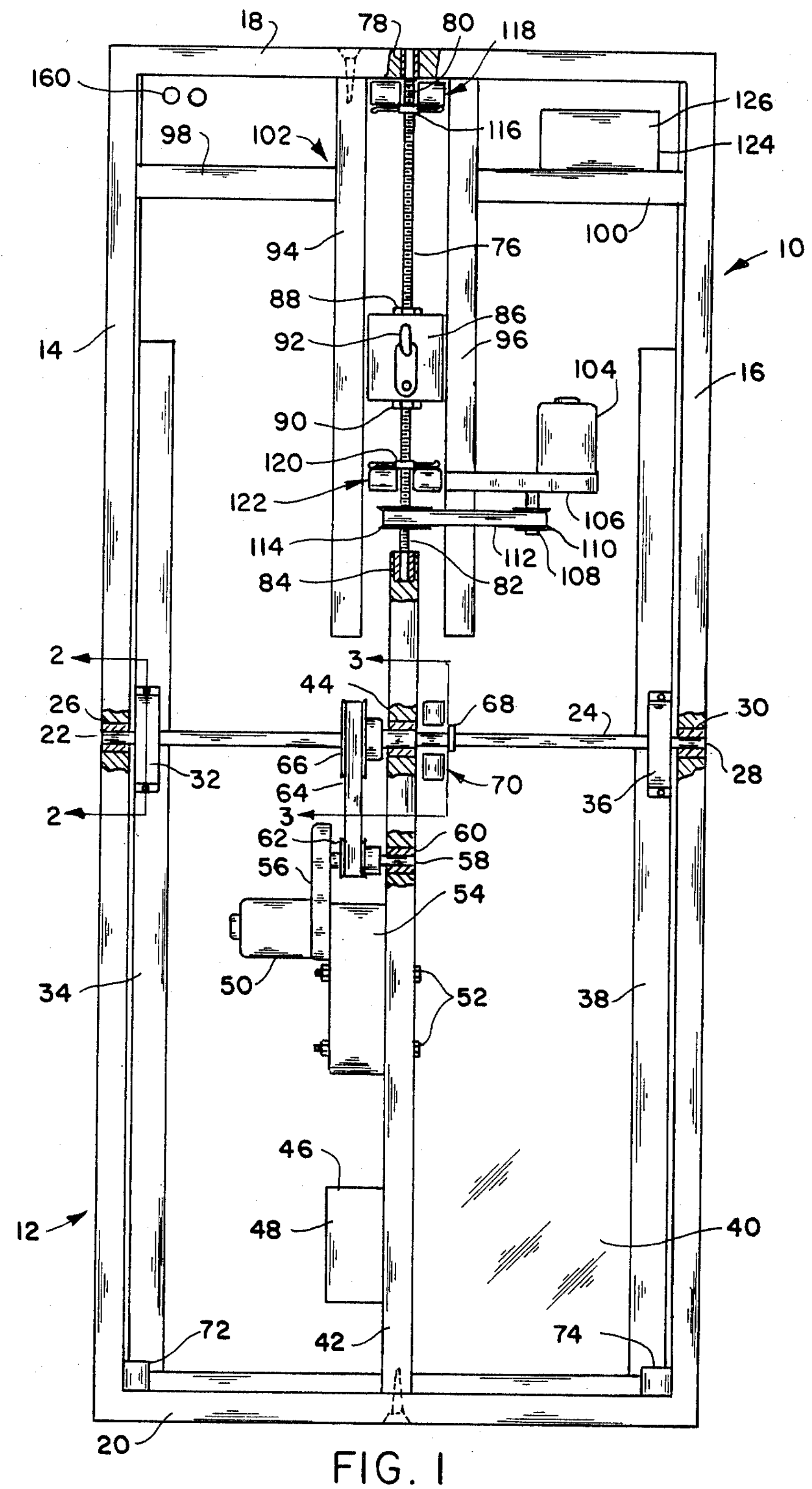
FIG. 1 is an elevational view of the rear of the flexible mirror device.

FIG. 1 is an elevational view of the rear of the flexible mirror device generally designated 10. The flexible mirror device 10 includes a frame generally designated 12. The frame 12 comprises a first frame member 14 and a second frame member 16 disposed parallel to the first frame member 14. An upper and a lower frame member, 18 and 20, respectively, are spaced from each other and extend between the first and the second frame members 14 and 16, respectively. A first end 22 of a transverse shaft 24 is rotatably secured within a first frame member bearing 26 disposed within the first frame member 14. The second end 28 of the transverse shaft 24 is rotatably secured within a second frame member bearing 30 disposed within the second frame member 16 such that the transverse shaft 24 extends between the first and second frame members 14 and 16, respectively. A first cam 32 is rigidly secured to the transverse shaft 24 adjacent the first end 22 thereof. The first cam 32 cooperates with a first mirror support 34 such that rotation of the transverse shaft 24 results in rotation of the first cam 32 to move the first mirror support 34 relative the transverse shaft 24. Similarly, a second cam 36 is rigidly secured to the transverse shaft 24 adjacent the second end 28 thereof. The second cam 36 cooperates with a second mirror support 38 such that rotation of the transverse shaft 24 results in rotation of the second cam 36 to move the second mirror support 38 relative the transverse shaft 24. A flexible mirror 40 extends between the first and the second mirror supports 34 and 38, respectively, with the edges of the mirror 40 lying adjacent and secured to the first and second mirror supports 34 and 38, respectively. A central frame member 42 extends between the lower frame member 20 and the transverse shaft 24, the central frame member 42 defining a central frame member transverse shaft bearing 44 for rotatably supporting the transverse shaft 24. The flexible mirror 40 is attached to the central frame member 42 by means of a first adhesive patch 46 which cooperates with a corresponding adhesive patch disposed on an extension 48 of the central frame member 42. A first electric motor 50 is secured to the central frame member 42 by means of bolts 52 which extend through a first motor spacer 54. A first electric motor reduction gear box 56 is driven by the motor 50 and drives a driven shaft 58 which is rotatably mounted within a driven shaft bearing 60 disposed within the central frame member 42. A first driven shaft pulley 62 keyed to the driven shaft 58 is connected by a first belt drive 64 to a transverse shaft pulley 66 keyed to the transverse shaft 24. A transverse shaft collar 68 is keyed to the transverse shaft 24 and a first micro switch means generally designated 70 is mounted on the central frame member 42 for cooperating with the transverse shaft collar 68 as described hereinafter with reference to FIG. 3. A first stop 72 disposed adjacent the junction of the first and lower frame members 14 and 20, respectively, limits the rearward movement of the flexible mirror 40, the first stop 72 abutting against one end of the first mirror support 34. Similarly, a second stop 74 disposed adjacent the junction of the second and lower frame members 16 and 20, respectively, limits the rearward movement of the flexible mirror 40, the second stop 74 abutting against one end of the second mirror support 38.

A longitudinal shaft 76 extends between the upper frame member 18 and the central frame member 42. The longitudinal shaft 76 is rotatably secured within an upper frame member bearing 78 adjacent a first end 80 of the longitudinal shaft 76. The second end 82 of the longitudinal shaft 76 is rotatably secured with a central frame member longitudinal shaft bearing 84. A hook carriage 86 threadably engages the longitudinal shaft 76 by means of captive nuts 88 and 90 secured within opposite ends of the hook carriage 86. A hook 92 is screwed to or otherwise secured to the hook carriage 86. A first and second rail 94 and 96, respectively, depend from the upper frame member 18 and are disposed parallel to each other on opposite sides of the longitudinal shaft 76. The rails 94 and 96 guide the hook carriage 86 along the length of the longitudinal shaft and, in conjunction with the flexible mirror 40, prevent rotation of the hook carriage 86 relative the longitudinal shaft 76. A first flexible transverse frame member 98 extends between the first frame member 14 and the first rail 94. A second flexible transverse frame member 100 extends between the second frame member 16 and the second rail 96. The combination of the first and second rails 94 and 96 and the first and second flexible transverse frame members 98 and 100, respectively, constitute a flexible transverse frame means generally designated 102. A second electric motor 104 and second motor reduction gear box 106 are secured to the second rail 96. An output shaft 108 of the gear box 106 is keyed to a second drive pulley 110. A second drive belt 112 driven by pulley 110 drives a second driven pulley 114 keyed to the longitudinal shaft 76. A longitudinal shaft first collar 116 is keyed to the first end 80 of the longitudinal shaft 76. The collar 116 cooperates with a second micro switch means 118 secured to the upper frame member 18. A longitudinal shaft second collar 120 is keyed to the second end 82 of the longitudinal shaft 76. The collar 120 cooperates with a third micro switch means 122 supported adjacent the first and second rails 94 and 96, respectively. A second adhesive patch 124 disposed on the back of the flexible mirror 40 cooperates with a corresponding adhesive patch disposed on an extension 126 of the second flexible transverse frame member 100.

Figure 2:
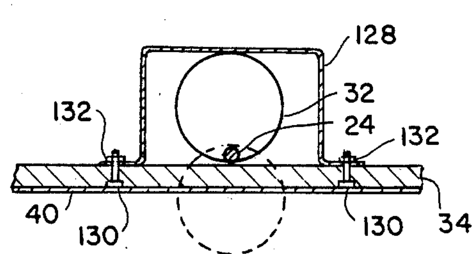
FIG. 2 is a sectional view taken along the line 2—2 of FIG. 1.

With reference to FIG. 2 of the drawings, the first cam 32 is held captive against the first mirror support 34 by means of a cage 128. The cage 128 is secured to the first mirror support 34 by a pair of bolts and cooperating nuts 130 and 132, respectively. The flexible mirror 40 is attached to the first mirror support 34 by adhesive or any other suitable means of attachment.

Figure 3:
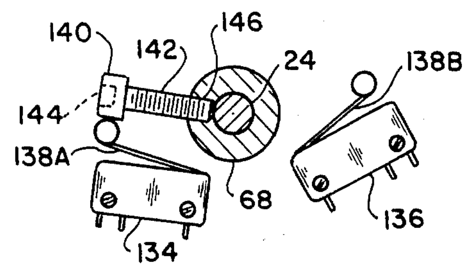
FIG. 3 is a sectional view of the micro switch means taken on the line 3—3 of FIG. 1.

FIG. 3 is a sectional view of the first micro switch means generally designated 70. However, FIG. 3 equally represents a sectional view taken through the second or third micro switch means 118 and 122, respectively. The micro switch means 70 includes a first and a second micro switch 134 and 136, respectively. Each of the micro switches 134 and 136, respectively, include a biased operating arm 138, designated 138A and 138B respectively, which cooperates with the head 140 of a screw 142. The head 140 defines an aperture 144 for the reception of an "Allen" key or the like. The screw 142 threadably cooperates with a radial bore 146 defined by the transverse shaft collar 68. The collar 68 defines a longitudinal bore which is slightly greater in diameter than the transverse shaft 24 such that the collar 68 can be slipped over the transverse shaft 24 and locked thereto by turning the screw 142 within the radial bore 146.

Figure 4:
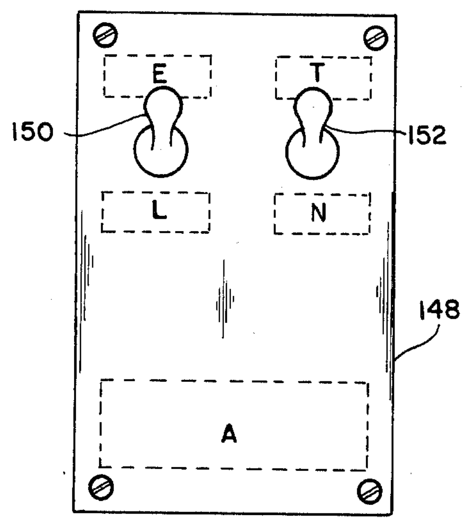
FIG. 4 is a front elevational view of the control box.

FIG. 4 is a front elevational view of a control box generally designated 148. The control box 148 includes a first and a second throw switch 150 and 152, respectively. Switch 150, when disposed in a first position indicated by the letter E, causes the energizing of the second motor 104 to "elevate" the flexible mirror device relative the hook 92. Conversely, the switch, when in the second position thereof as indicated by the letter L, causes the motor 104 to reverse thereby resulting in the "lowering" of the mirror device. The switch 152 includes a first and a second position as indicated respectively by the letters T and N. In the first position thereof, the first motor 50 is energized to cause an increase in the curvature of the flexible mirror 40. The increasing curvature of the mirror 40 results in the reflection of the body of a viewer becoming "thinner". The second position of the switch 152 results in the reversing of the motor 50 and the reduction in curvature of the mirror 40 until the mirror supports 34 and 38 contact the first and second stop 72 and 74, respectively. At the second position of the switch 152, the mirror reflects a substantially "normal" representation of the body of the viewer.

Figure 5:
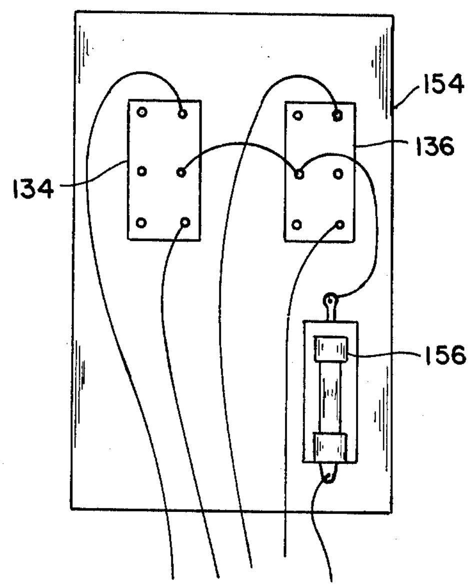
FIG. 5 is a rear view of the micro switch means showing part of the electrical circuitry of the same.

FIG. 5 is a rear view of the micro switch means 70 and shows the switches 134 and 136 mounted on a support board 154. A cartridge fuse 156 is electrically connected to the switch 136 and the micro switch means 70, 118 and 122 are electrically connected to a digital display device 160 mounted on the front of the flexible mirror 40. The control box 148 is electrically connected by means of a wiring harness or by radio control means.

In operation of the flexible mirror device 10, when the switch 150 is raised to the first position thereof, the second motor 104 rotates and the rotational force of motor 104 is transmitted to the longitudinal shaft 76 by means of the gear box 76, shaft 108, pulley 110, belt 112 and pulley 114, respectively. Pulley 114 is keyed to the longitudinal shaft 76 such that rotation of the motor 104 results in the rotation of the longitudinal shaft 76 within bearings 78 and 84. The hook carriage 86 threadably engages the longitudinal shaft 76 by means of the captive nuts 88 and 90 which are rigidly secured to the carriage 86. The carriage 86 is guided by and prevented from rotating by the rails 94 and 96 which cooperate with the carriage. When the longitudinal shaft 76 rotates, the carriage 86 moves longitudinally relative thereto. The hook 92 attached to the carriage 86 is fastened to a supporting wall or the like (not shown), and relative movement between the carriage and the longitudinal shaft results in the flexible mirror device 10 moving longitudinally relative the stationary hook 92.

The micro switch means 118 and 122 sense the location of the carriage 86 relative to the longitudinal shaft 76 and may be electrically connected to a Light Emitting Diode display 160 mounted on the front face of the flexible mirror 40. When the mirror device is to be lowered, switch 150 is lowered to the second position thereof such that the motor 104 is reversed.

Raising of the switch 152 causes the energizing of the first electric motor 50. Rotational movement of motor 50 is transmitted to the transverse shaft 24 by gearbox 56, shaft 58, pulley 62, belt 64 and pulley 66, respectively. Pulley 66 is keyed to the transverse shaft 24 such that one half revolution of the transverse shaft 24 causes the cams 32 and 36 to move the mirror supports 34 and 38, respectively, from a first position to a second position thereof, away from the transverse shaft 24. In the first position of the cams 32 and 36, the flexible mirror 40 has the least curvature thereof, but the curvature of the flexible mirror is progressively increased until the second position of the cams 32 and 36 is reached. The cams 32 and 36 are each retained within and cooperate with a cage 128 shown in FIG. 2. The first cam 32 is rigidly secured to the transverse shaft 24, the cam 32 being eccentrically mounted thereon. As the shaft 24 and the cam 32 rotate, the cage 128 which is secured to the mirror support 34 is moved away from the transverse shaft 24. The second position of the cam 32 is shown in phantom outline in FIG. 2.

When the switch 152 is moved to the second or lower position thereof, motor 50 reverses and the transverse shaft 24 and cams 32 and 36 rotate in the opposite direction until the first position of the cams 32 and 36 is again attained. In the first position of the cams, the flexible mirror 40 has the least curvature and the reflection of the body of a viewer will appear nearest to normal.

Movement of the mirror supports 34 and 38 from the first to the second position thereof, results in a progressive increase in curvature of the flexible mirror 40 attached thereto. This increase in curvature occurs particularly in the vicinity of the transverse shaft 24. The increase in curvature in this lower portion of the flexible mirror results because the mirror 40 is secured relative the central frame member 42 midway between the mirror supports. The flexible mirror 40 is also supported adjacent the first and second transverse frame members 98 and 100. The frame members 98 and 100 being flexible, permit the mirror 40 to assume a curved configuration relative thereto. This curved configuration in the vicinity of the frame members 98 and 100 or in the vicinity of the upper portion of the flexible mirror is such that the curvature in the mirror 40 in the vicinity of the frame members 98 and 100 will not be as great as the change of curvature resulting from movement of mirror supports 34 and 38. The change in curvature of the mirror 40 in the vicinity of the transverse shaft 24 or lower portion of the flexible mirror is proportional to but different from the change in curvature of the upper portion of the flexible mirror in the vicinity of the transverse frame members 98 and 100. The reflection of the body of the viewer will therefore appear to become thinner progressively as the mirror 40 continues to increase in curvature. However, although the reflection of the body of the viewer from the neck down becomes thinner, the reflection of the face of the viewer will also progressively become thinner but not to the same extent as the progressive thinning of the rest of the reflection of the viewer.

The transverse shaft collar 68 and cooperating first micro switch means 70 sense the relative position of the transverse shaft 24 and attached cams and are electrically connected to the digital display device 160 disposed on the front of the flexible mirror 40. The display device 160 which may be a LED-type display may indicate the change in curvature of the mirror 40 from the first position of the cams 32 and 36 to the second position thereof.

Figure 6:
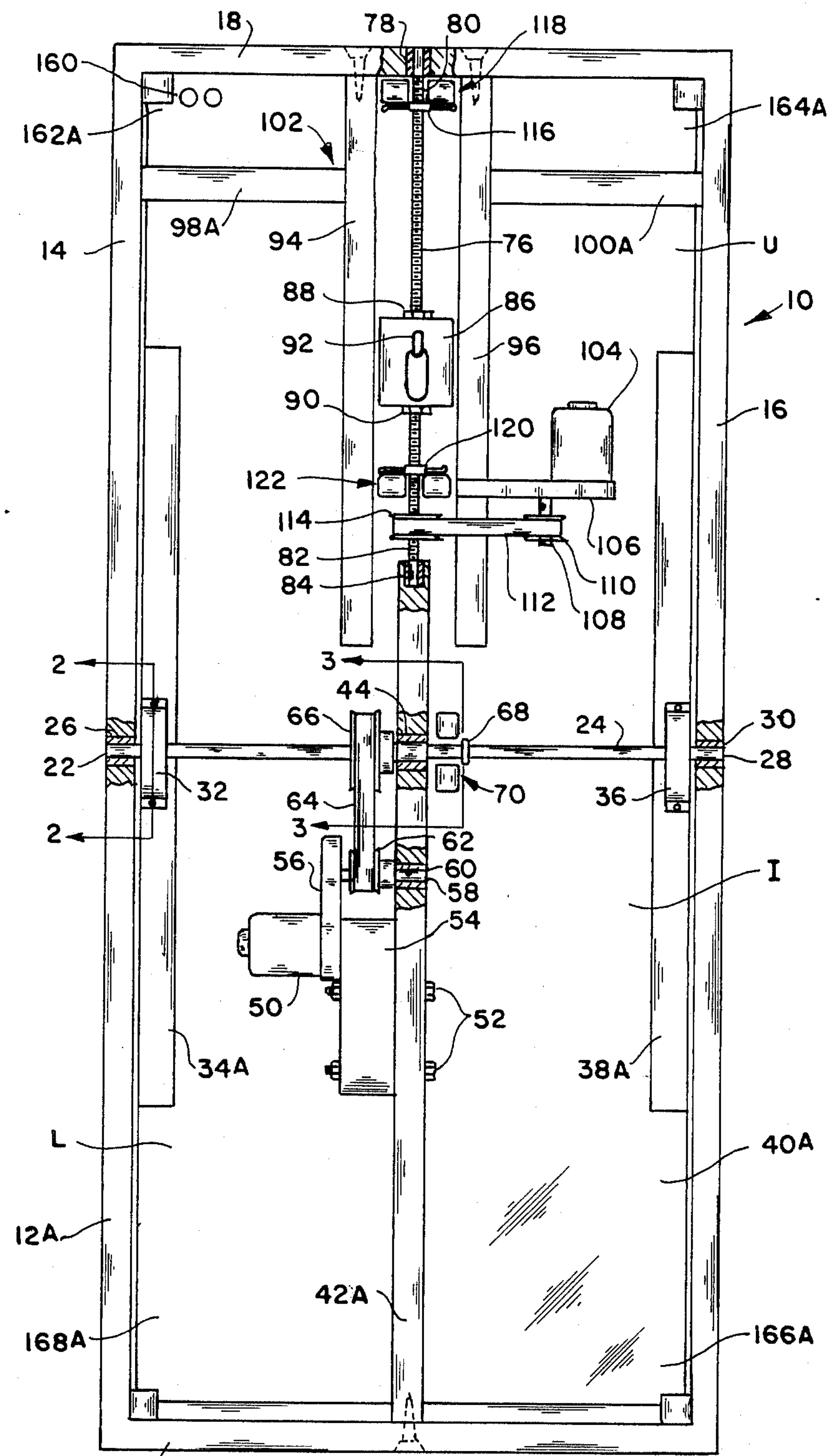
FIG. 6 is an elevational view of the rear of a further embodiment of the present invention.

In a further embodiment of the present invention as shown in FIG. 6, the flexible mirror 40A includes an upper, a lower and an intermediate mirror portion, U, L and I, respectively. The upper mirror portion U of the flexible mirror 40A primarily reflects a representation of the face of the viewer. The lower mirror portion L primarily reflects a representation of the lower extremity of the body of the viewer including the feet. The intermediate mirror portion I primarily reflects a representation of the portion of the body of the viewer between the face and the lower extremity of the body. As in the case of the first embodiment, the flexible mirror 40A is supported by a first and a second mirror support, 34A and 38A, respectively. However, mirror supports 34A and 38A only extend along the sides of the flexible mirror 40A in the vicinity of the intermediate mirror portion I. Each corner 162A, 164A, 166A and 168A, respectively, of the flexible mirror 40A is rigidly secured to an adjacent portion of the frame 12A. Unlike the mirror 40 of the first embodiment, the mirror 40A is not secured to the central frame member 42A or to the first and second transverse frame members 98A and 100A, respectively. Rather, the mirror 40A is supported by the frame 12A adjacent each corner of the mirror. The remainder of the mirror device of the further embodiment of the present invention is identical to that of the first embodiment.

In operation of the further embodiment of the mirror device, a viewer stands in front of the mirror 40A and operates the first switch to raise or lower the mirror 40A such that the reflection of the face of the viewer is seen in the upper mirror portion U. Actuation of the second switch causes the mirror 40A to progressively curve about the longitudinal axis of the mirror. Because the flexible mirror 40A is anchored at each corner thereof and because of the flexibility of the material from which the mirror is made, the curvature in the vicinity of the intermediate mirror portion I will be greater than the corresponding curvature in the vicinity of the upper and lower mirror portions U and L, respectively. With the mirror device of the further embodiment, the representation to the viewer of the desired weight loss is apparent in the intermediate mirror portion where most people who need to diet wish to lose weight. Although the representation to the viewer of the face and feet appear to diminish in size, this decrease in size is minimal in comparison with the loss in size in the vicinity of the intermediate mirror portion.

The flexible mirror device of the present invention provides a significant improvement over the prior art mirror devices because the reflection of the body of a viewer can be made to become progressively thinner with the thinning of the reflection of the face to the rest of the body being proportional relative each other, the least thinning being in the vicinity of the face of the viewer. This feature of the present invention provides a reflection of the body of a viewer which more accurately represents how the body of the viewer will appear to others in actuality after the viewer has lost weight.

What is claimed is:

1. A flexible mirror device for providing a modified reflection of the body of a person, comprising in combination:

- a first frame member;
- a second frame member disposed parallel to said first frame member;
- a an upper and a lower frame member extending respectively between said first and said second frame members, said upper and said lower frame members being spaced relative each other;
- a transverse shaft extending between said first and said second frame members, said transverse shaft being located between said upper and said lower frame members;
- a first frame member bearing associated with said first frame member for rotatably supporting a first end of said transverse shaft;
- a second frame member bearing associated with said second frame member for rotatably supporting a second end of said transverse shaft;
- a first cam rigidly secured to said transverse shaft adjacent said first end of said transverse shaft;
- a first mirror support cooperating with said first cam for moving said first mirror support relative said transverse shaft upon rotation of said transverse shaft;
- a second cam rigidly secured to said transverse shaft adjacent said second end of said transverse shaft;
- a second mirror support cooperating with said second cam for moving said second mirror support relative said transverse shaft upon rotation of said transverse shaft;
- a central frame member extending between said lower frame member and said transverse shaft;
- a central frame member transverse shaft bearing associated with said central frame member for rotatably supporting said transverse shaft;
- a flexible mirror extending between and rigidly secured to said first and said second mirror supports;
- first attachment means associated with said central frame member for securing said mirror relative said central frame member;
- a flexible transverse frame means extending between said first and said second frame members for flexibly supporting said flexible mirror in the vicinity of said upper frame member; and
- second attachment means associated with said transverse frame means for securing said mirror relative said flexible transverse frame means such that rotation of said transverse shaft results in a differential change in curvature of the mirror in the vicinity of the transverse shaft relative to the changing curvature of the mirror in the vicinity of the flexible transverse frame means.

2. A flexible mirror device as set forth in claim 1 further comprising a first driving means for rotating said transverse shaft.

3. A flexible mirror device as set forth in claim 2 wherein said first driving means includes a first electric motor.

4. A flexible mirror device as set forth in claim 3 further comprising an electrical control box located remote from and electrically connected to said first electric motor, said control box controlling rotation of said transverse shaft and said differential change in curvature of said mirror.

5. A flexible mirror device as set forth in claim 3 further comprising radio control means located remote from said first electric motor for controlling rotation of said transverse shaft and said differential change in curvature of said mirror.

6. A flexible mirror device as set forth in claim 3 further comprising:

- a transverse shaft collar rigidly secured to said transverse shaft;
- a first micro switch means disposed adjacent said transverse shaft collar for sensing the relative rotational position of said transverse shaft; and
- a first display device disposed on said mirror, said display being electrically connected to said first micro switch means to display the curvature of said mirror.

7. A flexible mirror device as set forth in claim 6 wherein said first display device is a Light Emitting Diode display.

8. A flexible mirror device as set forth in claim 1 further including:

- a longitudinal shaft rotatably secured and extending between said upper frame member and said central frame member;
- a rail disposed parallel to said longitudinal shaft, said rail depending from said upper frame member;
- a hook carriage threadably engaging said longitudinal shaft such that rotation of said longitudinal shaft results in movement of said hook carriage along said longitudinal shaft, said rail preventing rotation of said hook carriage relative said mirror; and
- a hook rigidly secured to said hook carriage to permit mounting of said flexible mirror device such that rotation of said longitudinal shaft results in relative movement between said flexible mirror device and said hook.

9. A flexible mirror device as set forth in claim 8 further comprising a second driving means drivingly connected to said longitudinal shaft for rotating said longitudinal shaft relative said hook carriage.

10. A flexible mirror device as set forth in claim 9 further including an electrical control box located remote from and electrically connected to said second driving means, said control box controlling rotation of said longitudinal shaft.

11. A flexible mirror device as set forth in claim 9 further comprising a radio control means located remote from said second electrical driving means for controlling rotation of said longitudinal shaft.

12. A flexible mirror device as set forth in claim 9 further comprising:

- a longitudinal shaft first collar rigidly secured to a first end of said longitudinal shaft;

a second micro switch means cooperating with said longitudinal shaft first collar for sensing the upper position of said hook carriage relative said longitudinal shaft;

a longitudinal shaft second collar rigidly secured to a second end of said longitudinal shaft; and a third micro switch means cooperating with said longitudinal shaft second collar for sensing the lower position of said hook carriage relative said longitudinal shaft.

13. A flexible mirror device as set forth in claim 12 further including a second display device electrically connected to said second and said third micro switch means for displaying the position of said flexible mirror device relative to said hook.

14. A flexible mirror device as set forth in claim 13 wherein said second display device is a Light Emitting Diode display.

15. A flexible mirror device for providing a modified reflection of the body of a person, comprising in combination:

a first frame member;

a second frame member disposed parallel to said first frame member;

an upper and a lower frame member extending respectively between said first and said second frame members, said upper and said lower frame members being spaced relative each other;

a transverse shaft extending between said first and said second frame members, said transverse shaft being located between said upper and said lower frame members, said transverse shaft being rotatably secured relative said first and said second frame members;

a first cam rigidly secured to said transverse shaft adjacent said first frame member;

a first mirror support cooperating with said first cam for moving said first mirror support relative said transverse shaft upon rotation of said transverse shaft;

a second cam rigidly secured to said transverse shaft adjacent said second frame member;

a second mirror support cooperating with said second cam for moving said second mirror support relative said transverse shaft upon rotation of said transverse shaft;

a central frame member extending between said lower frame member and said transverse shaft;

a central frame member transverse shaft bearing associated with said central frame member for rotatably supporting said transverse shaft;

a flexible mirror extending between and rigidly secured to said first and said second mirror supports;

a first adhesive patch disposed adjacent said central frame member for securing said mirror to said central frame member;

a flexible transverse frame means extending between said first and said second frame members for flexibly supporting said mirror in the vicinity of said upper frame member;

a second adhesive patch disposed adjacent said transverse frame means for securing said mirror relative said flexible transverse frame means such that rotation of said transverse shaft results in a differential change in curvature of the mirror in the vicinity of the transverse shaft relative to the change in curvature of the mirror in the vicinity of the flexible transverse frame means;

a longitudinal shaft rotatably secured and extending between said upper frame member and said central frame member;

a pair of rails disposed parallel to said longitudinal shaft, said pair of rails depending from said upper frame member;

a hook carriage threadably engaging said longitudinal shaft such that rotation of said longitudinal shaft results in movement of said hook carriage along said longitudinal shaft, said pair of rails guiding and preventing rotation of said hook carriage relative said mirror; and a hook rigidly secured to said hook carriage to permit mounting of said flexible mirror device such that rotation of said longitudinal shaft results in relative movement between said flexible mirror device and said hook.

* * * * *